Aug. 10, 1937. W. SCHNEIDER 2,089,764
ANTIHALATION LAYER
Filed Feb. 24, 1933
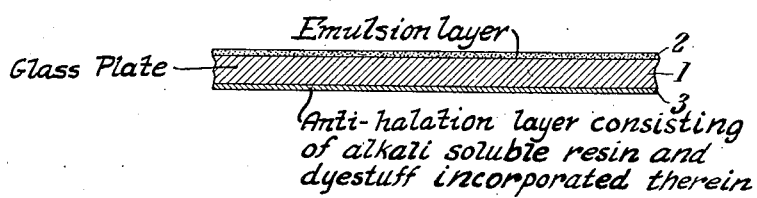
Inventor:
Wilhelm Schneider,
By Attorney
Philip S. Hopkins.

Patented Aug. 10, 1937

2,089,764

UNITED STATES PATENT OFFICE 2,089,764

ANTIHALATION LAYER

Wilhelm Schneider, Dessau in Anhalt, Germany, assignor to Agfa Ansco Corporation, Binghamton, N. Y., a corporation of New York Application February 24, 1933, Serial No. 658,453
In Germany March 1, 1932

4 Claims. (Cl. 95—8)

My present invention relates to anti-halation layers for photographic plates and films.

One of its objects is to provide a plate or film with an anti-halation layer soluble in the photographic baths. Further objects will be seen from the detailed specification following hereafter.

For anti-halation purposes usually the back of photographic plates and films is provided with a colored layer which may be a coherent dye layer or layer comprising a dye and a binding agent. The anti-halation layers must be destructible or removable; either the layer must be decolorized by the photographic baths or the layer must be detachable or soluble. In the last instance the colloid forming the binding agent was hitherto soluble in water. Such layers, however, have the drawback that they are sensitive to water and stick to the emulsion layer if in contact therewith during storage, or the dye may diffuse into the emulsion layer. Furthermore a colloid layer which is insoluble can in the case of a great many dyes be decolorized only with difficulty. Difficulties do not arise with anti-halation layers consisting of a coherent dye layer, however, there are only a few dyes available in this case.

I have found that as binding agent for the manufacture of anti-halation layers there are suitable such artificial resins as contain a hydroxyl group or a carboxyl group capable of forming a salt. These resins are perfectly resistant to moisture and are smoothly soluble in the photographic developer or another alkaline bath.

As suitable artificial resins may be named, for instance the condensation products of formaldehyde or a substance splitting off formaldehyde or a phenol alcohol with a phenol, a phenylalkyl ether, a phenylaryl ether, an oxycarboxylic acid, an alkyloxy-carboxylic acid or a phenoxy-fatty acid; also an artificial resin which has been treated with a halogenated fatty acid, or a product obtained by condensing a phenol or a phenolcarboxylic acid with an aliphatic, aromatic or heterocyclic aldehyde or with thionyl chloride. The formation of these products is known (compare for instance German patent specifications Nos. 364,040, 371,148, 391,539, 439,962, 449,276, 363,-383, 358,401, 357,757, 339,495, 357,758) and is not claimed in this invention.

The layer material is applied in known manner in form of a solution. As dyestuff additions there may be used water-soluble as well as water-insoluble dyestuffs.

The following examples illustrate the invention:

Example 1.—A solution consisting of 10 grams of artificial resin from salicylic acid and paraldehyde, 1 gram of fuchsone and 100 grams of isobutanol is applied on the back of an acetyl- or nitro-film, to form a layer of about 1 to 2$\mu$ thickness. There is obtained a red anti-halation layer which in feebly alkaline developing solutions is dissolved within a short time.

Example 2.—A solution of 10 grams of artificial resin from phenoxyacetic acid and formaldehyde, 100 grams of propanol and 0.5 gram 3.4 - dimethoxystyryl-2 - quinoline - ethylchloride obtainable by condensation of quinaldine hydrochloride and 3.4-dimethoxybenzaldehyde is applied on the back of a support. This layer is readily soluble in a photographic developer.

Example 3.—A solution of 10 grams of artificial resin from o-methoxybenzoic acid and formaldehyde, 100 grams of propanol, 1 gram of oxytolylaminofuchsondicarboxylic acid (obtainable by condensation of para-tolylamino-benzaldehyde and ortho-cresotinic acid and oxidation of the leuco compound thus produced) and 1 gram of benzarine is applied on the back of a support. This layer dissolves very readily in alkaline baths.

Example 4.—A solution of 10 grams of artificial resin from phenoxyacetic acid and p-cresoldialcohol, 1 gram of dimethyloxyfuchsondicarboxylic acid obtainable by condensation of benzaldehyde and ortho-cresotinic acid and oxidation of the leuco compound and 100 cc. of alcohol is applied on the back of a support. The layer dissolves easily in the photographic developing baths.

The invention is not limited to the foregoing examples or to the specific details given therein. The solvent used for making the solution of the resin and the concentration of the solution are adapted to the requirements and can easily be determined by a few simple experiments. The hydroxyl group or carboxyl group can be contained in the aliphatic radical or in the aromatic radical of the resin.

The accompanying drawing illustrates the invention. The figure represents a sectional view of a photographic plate. 1 is the glass plate which serves as support, 2 is the emulsion layer, 3 is the anti-halation layer applied to the back of the plate.

What I claim is:

1. A photographic plate or film comprising a support bearing on one side a light-sensitive emulsion layer and on the other side an anti-halation layer consisting of a formaldehyde-phenoxyacetic acid resin, and 3.4-dimethoxy-styryl-2-quinoline-ethyl-chloride incorporated in said resin.

2. A photographic plate or film comprising a support of nitrocellulose bearing on one side a light-sensitive emulsion layer and on the other side an anti-halation layer consisting of a salicylic acid-paraldehyde resin, and fuchsone incorporated in said resin.

3. A photographic plate or film comprising a support bearing on one side a light-sensitive emulsion layer and on the other side an anti-halation layer consisting of a phenoxyacetic acid-p-cresoldialcohol resin, and dimethyloxyfuchson-dicarboxylic acid incorporated in said resin.

4. A photographic plate or film comprising a support bearing on one side a light-sensitive emulsion layer and on the other side an anti-halation layer consisting of an alkali-soluble resin selected from the group consisting of formaldehyde-oxyphenylcarboxylic acid resins, formaldehyde-alkoxyphenylcarboxylic acid resins, formaldehyde-phenoxy fatty acid resins, phenol-alcohol-phenylalkyl ether resins, phenolalcohol-phenyl-aryl-ether resins, phenol-alcohol-oxyphenylcarboxylic acid resins, phenolalcohol-alkoxyphenylcarboxylic acid resins and phenolalcohol-phenoxy fatty acid resins, phenol-aliphatic aldehyde resins, phenol-aromatic aldehyde resins, phenol-heterocyclic aldehyde resins, phenolthionylchloride resins, phenol-carboxylic acid-aromatic aldehyde resins, phenolcarboxylic acid-heterocyclic aldehyde resins and phenolcarboxylic acid-thionylchloride resins and a dye incorporated in said resin.

WILHELM SCHNEIDER.